United States Patent [19]

Nishihara et al.

[11] Patent Number: 5,037,233
[45] Date of Patent: Aug. 6, 1991

[54] BICYCLE FRAME

[75] Inventors: Munekazu Nishihara, Neyagawa; Kenichiro Suetsugu, Amagasaki; Tetsuo Fukushima, Hirakata; Jyunji Ikeda, Ikoma; Yakeshi Yoshii, Osaka; Masato Tanida, Yao; Kazumi Nishimura, Higashiosaka, all of Japan

[73] Assignee: Matsushita Electric Industrial Co., Ltd., Osaka, Japan

[21] Appl. No.: 447,356

[22] Filed: Dec. 7, 1989

[30] Foreign Application Priority Data

Dec. 9, 1988 [JP] Japan ................................. 63-312238

[51] Int. Cl.⁵ ............................................. B25G 3/34
[52] U.S. Cl. ..................................... 403/266; 403/326; 403/404; 285/381
[58] Field of Search ...................... 403/28, 29, 326, 5, 403/404, 266; 285/381

[56] References Cited

U.S. PATENT DOCUMENTS

| 119,232 | 9/1871 | Jones | 403/28 X |
| 637,046 | 11/1899 | Taylor | 403/272 |
| 4,281,841 | 8/1981 | Kim et al. | 285/381 X |
| 4,583,755 | 4/1986 | Diekman et al. | 280/281 R |
| 4,585,246 | 4/1986 | Diekman et al. | 280/281 R |

Primary Examiner—Andrew V. Kundrat
Attorney, Agent, or Firm—Panitch, Schwarze, Jacobs & Nadel

[57] ABSTRACT

A bicycle frame comprising a lug and a pipe to be fitted onto a projection at the lug, annular grooves opposite to each other being disposed at the mutual contact surfaces of the lug projection and pipe, wherein an unidirectional form memory alloy changeable of its outer diameter by heating is disposed in one of the opposite annular grooves, and the projection of the lug and the pipe are bonded at the fitting surfaces by means of a thermosetting adhesive, whereby the bicycle frame is high in safety and superior in productivity and has an improved bonding strength and mechanical juncture.

3 Claims, 1 Drawing Sheet 5,037,233

BICYCLE FRAME

BACKGROUND OF THE INVENTION

1. Field of the Invention

The present invention relates to a bicycle frame that comprises pipe members bonded to each other by the use of an adhesive.

2. Description of the Prior Art

Conventional bicycle frames have been manufactured by jointing steel pipes by the process of brazing or resistance welding. As novel materials have recently been developed, for the purpose of making the frames lightweight, materials, such as aluminum alloys or fiber reinforcement plastics, have begun to be used extensively.

When the conventional process is applied to such novel materials, the materials may deteriorate at high temperature. To avoid this problem, the lightweight frames are manufactured by bonding using an adhesive. The manufacture of bicycle frames by means of bonding is advantageous in that large equipment, such as a conventional welder, is not required, and a simplification of the manufacturing process and an improvement in the work environment are expected (which will be a leader in the bicycle manufacturing process in the future).

However, there is a problem when such a bonding is carried out only using adhesive, because there is no industrial standard for reliability or aged deterioration. Therefor, both the bonding and mechanical juncture using screw bolts or rivets must be used so as to give weight for safety. As a result, the manufacturing process becomes complicated. Moreover, the bonding strength at the interface (i.e., the essential characteristic of the adhesive) is reduced, in such a manner that a centralized stress is generated at the portion where rivets or the like are used, or a bonding layer is peeled off by the tip of a screw bolt or a ring when mounted, so that a clearance cannot be kept constant. Also, a gap is created at the interface between the frame and the bonding layer so that water enters into the gap in the market environment and thereby promotes corrosion at the interface.

SUMMARY OF THE INVENTION

The bicycle frame of this invention, which overcomes the above-discussed and numerous other disadvantages and deficiencies of the prior art, comprises a lug and a pipe to be fitted onto a projection at the lug, annular grooves opposite each other being disposed at the mutual contact surfaces of the lug projection and pipe, wherein an unidirectional form memory alloy changeable on its outer diameter by heating is disposed in one of the opposite annular grooves, and the projection of the lug and the pipe are bonded at the fitting surfaces by means of a thermosetting adhesive.

In a preferred embodiment, the projection at the lug is tapered off toward the utmost end from the root and provided with a plurality of fin-like projections extending from the root toward the utmost end of the lug projection, said fin-like projections being larger in the addendum circle thereof than an inner diameter of the pipe.

In a preferred embodiment, an aluminum alloy is used as a material for the pipe and the lug, and a bonding adhesive of a chlorine concentration of 100 ppm or less is used as the thermosetting adhesive.

According to the present invention, a bonded portion is heated after the pipe is inserted onto the lug so that the adhesive is thermoset and the form memory ring is centrifugally expanded so as to be fitted into the opposite annular groove, whereby the pipe is insertable without peeling off the bonding layer and mechanical bonding is also possible.

Also, according to the present invention, the tapered lug projection facilitates insertion of the pipe and the plurality of fin-like projections of the addendum circle larger than the inner diameter of the pipe are provided to enable the centering of the frame and a clearance from the pipe to be kept constant simply by press-fitting the pipe onto the lug projection.

Furthermore, the present invention uses the adhesive of chlorine concentration of 100 ppm or less, so that even when water enters into the bonding interface, a corrosion reaction with an aluminum material can be restrained from progressing.

Thus, the invention described herein makes possible the objectives of (1) providing a bicycle frame that is high in safety and superior in productivity; (2) providing a bicycle frame that has an improved bonding strength and mechanical juncture: (3) providing a bicycle frame that has an improved durability under a high temperature and high humidity environment; (4) providing a bicycle frame that is produced with high reliability, and (5) providing a bicycle frame that puts the essential characteristic of adhesives into practical use.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
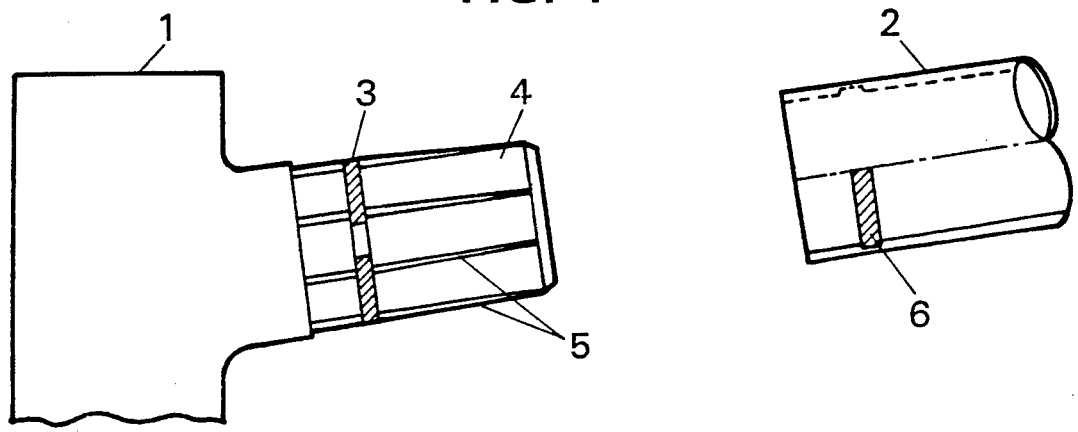
FIG. 1 is a plan view showing a part of the lug and a part of the pipe of a bicycle frame of this invention, which are to be bonded.

FIG. 1 shows a bicycle frame of this invention, which comprises a lug 1, the projection 4 of which is tapered and provided at the surface thereof with a plurality of fin-like projections 5, and a pipe 2 provided at the inner surface thereof with an annular groove 6. A form memory ring 3 housed in a groove formed at the surface of the projection 4 at the lug 1. The annular groove 6 is machined to be positioned around the form memory ring 3 when the pipe 2 is press-fitted onto the lug projection 4, the fin-like projections 5 being somewhat larger at the addendum circle thereof than an inner diameter of the pipe 2, and the lug projection 4 being smaller in an outer diameter of the utmost end than the inner diameter of pipe 2.

Figure 2:
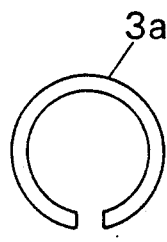
FIGS. 2 and 3 are plan views showing form memory rings used for bonding the lug with the pipe.
Figure 3:
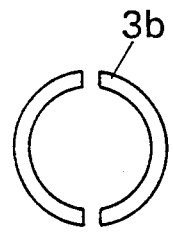

FIG. 2 shows a form memory ring 3a used in this embodiment, which is composed of a unidirectional form memory material equal in an outer diameter to the lug projection 4 at room temperature, but once heated the outer diameter expands so as not to change even after returned to room temperature. Alternatively, a form memory ring 3b divided into two as shown in FIG. 3 is usable.

Figure 4:
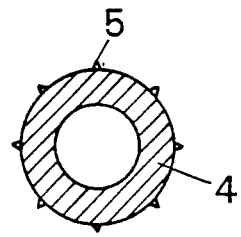
FIG. 4 is a cross-sectional view showing the lug projection of the lug shown in FIG. 1.

FIG. 4 shows a sectional view of the lug projection 4, at the surface of which are provided the plurality of fin-like projections 5 each of which is sharp at the top.

Next, explanation will be given on a connecting method of the lug 1 with the pipe 2. The lug 1 is precisely cast by the lost wax process or the like then sanded and thereafter degreased and cleaned, and the lug projection 4 is applied on the surface with an adhesive. Then, the form memory ring 3a is inserted into the groove formed at the surface of lug projection 4. On the other hand, an annular groove 6 is machined on the inner surface of the pipe 2, and then the inner bonding surface thereof is sanded, degreased and cleaned, after which an adhesive is applied onto the inner surface.

Next, the lug 1 and pipe 2 are press-fitted by the use of a device capable of simultaneously fitting a front triangular portion of the frame, after which surplus adhesive is wiped out, and the assembly is heated in a constant temperature oven.

Figure 5:
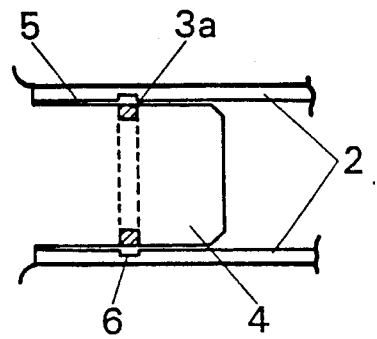
FIG. 5 is a sectional view showing an enlarged portion at which the lug and the pipe are connected to each other prior to a heating treatment.

FIG. 5 shows an enlarged portion at which the pipe 2 is connected to the lug 1 prior to heating. Since the form memory ring 3a and the lug projection 4 are equal in outer diameter at room temperature there is no fear that the adhesive is peeled off by the ring 3a when the pipe 2 is press-fitted. Accordingly, it is possible to uniformly interpose the adhesive between the lug 1 and the pipe 2. The tapered fin-like projections 5 permit the centering of the frame only by press-fitting the pipe 2 with ease. After being press-fitted, the lug 1 and pipe 2 are temporarily fixed, so that the clearance of bonding layer can be kept constant.

Figure 6:
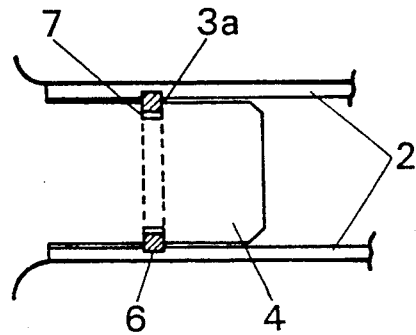
FIG. 6 is a sectional view showing where the lug and the pipe are connected to each other after the heat treatment.

FIG. 6 shows an enlarged portion at which the pipe is connected to the lug 1 after being heated. The form memory ring 3a is expanded while being heated in a constant temperature oven, and inserted into the annular groove 6, at which time the form memory ring 3a, as shown in FIG. 6, is fixed between an annular groove 7 at the lug projection 4 and the annular groove 6 at the pipe 2, thereby executing a mechanical juncture, during which time the adhesive is stabilized by thermosetting thereof, thereby obtaining a connection construction of further higher safety.

Next, explanation will be given on the adhesive and the material of pipe 2 and lug 1.

Conventionally, the adhesive for use in the bicycle frame contains, as the main ingredient, a bisphenol A type epoxy resin or the like and, as additives, a curing agent (cyanogen diamide or the like) and a small amount of rubber component, and usually further contains a filler of several tens of percent by weight.

In a case where an aluminum alloy is used as a material for the pipe or the lug, when water enters into the bonding interface, the aluminum alloy is affected by Cl ion contained in the epoxy resin so as to be corroded, thereby largely lowering the bond strength.

Therefore, this embodiment uses an adhesive wherein the concentration of Cl ion is reduced to 100 ppm or less, so that, as shown in Table 1, the reliability of the frame after subjected to a high temperature and high humidity test can be largely improved.

TABLE 1

|  | Cl Ion Concentration in Adhesive (ppm) | Number of Vibrations required to Breakdown of Frame after High Temperature and High Humidity Test |
| --- | --- | --- |
| Conventional Adhesive | 970 | 15,600 |
| Adhesive for This Embodiment | 85 | 175,400 |

As seen from the above, the bicycle frame of the present invention that comprises a pipe and a lug is provided at the contact surfaces of the pipe and the tapered lug projection at the lug with annular grooves opposite to each other. A thermosetting resin is filled between the pipe and the lug, one of the grooves of which houses therein a form memory ring or a bimetal, and heated to thereby bond the pipe onto the outer surface of lug projection by the thermosetting resin. The tapered lug projection gradually decreases in the outer diameter more than the inner diameter of pipe from the root of lug projection toward the utmost end thereof, and is provided at the surface of the lug projection with a plurality of fin-like projections extending from the root to the utmost end of the lug projection and having the addendum circle larger than the inner diameter of the pipe, so that the bonding strength of adhesive at the interface is improved, and the bicycle frame that is high in safety, superior in productivity, and has an improved bonding strength and mechanical juncture, can be provided.

Moreover, an adhesive, the Cl ion concentration of which is reduced to 100 ppm or less, is used for the bonding of an aluminum alloy parts that constitute a bicycle frame, so that the durability of the bicycle frame under a high temperature and high humidity environment can be improved, and moreover the bicycle frame can be manufactured with high reliability.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A bicycle frame comprising a lug having a projection and a pipe fitted onto the projection of the lug such that said pipe and lug projection have mutual contact surfaces, annular grooves opposite each other being disposed at the mutual contact surfaces of the lug projection and pipe, a unidirectional form memory alloy changeable on its outer diameter by heating disposed in one of the opposite annular grooves, and a thermosetting adhesive located on the mutual contact surfaces of the lug projection and pipe for bonding together the same.

2. A bicycle frame according to claim 1, wherein the projection at the lug is tapered off toward the utmost end from the root and provided with a plurality of fin-like projections extending from the root toward the utmost end of the lug projection, said fin-like projections being larger in the addendum circle thereof than an inner diameter of the pipe.

3. A bicycle frame according to claim 1, wherein an aluminum alloy is used as a material for the pipe and the lug, and a bonding adhesive of a chlorine concentration of 100 ppm or less is used as the thermosetting adhesive.

* * * * *

UNITED STATES PATENT AND TRADEMARK OFFICE
CERTIFICATE OF CORRECTION

PATENT NO. : 5,037,233

DATED : August 6, 1991

INVENTOR(S) : Munekazu Nishihara et al.

It is certified that error appears in the above-identified patent and that said Letters Patent is hereby corrected as shown below:

On the title page, item [75] Inventors:
Fifth inventor's name should be corrected as follows:

"Yakeshi Yoshii" should read:

--Takeshi Yoshii--.

Signed and Sealed this

Sixth Day of October, 1992

*Attest:*

DOUGLAS B. COMER

*Attesting Officer*  *Acting Commissioner of Patents and Trademarks*